(12) United States Patent
Chang

(10) Patent No.: US 8,954,599 B2
(45) Date of Patent: Feb. 10, 2015

(54) DATA STREAM OPERATIONS

(75) Inventor: Jichuan Chang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 13/284,389

(22) Filed: Oct. 28, 2011

(65) Prior Publication Data

US 2013/0111055 A1 May 2, 2013

(51) Int. Cl.
*G06F 15/173* (2006.01)

(52) U.S. Cl.
USPC .......................................... 709/231

(58) Field of Classification Search
USPC ............................................ 709/231
See application file for complete search history.

(56) References Cited

U.S. PATENT DOCUMENTS

| | | | |
|---|---|---|---|
| 4,975,835 A * | 12/1990 | Hidaka et al. | 712/225 |
| 5,548,775 A * | 8/1996 | Hershey | 711/109 |
| 7,225,188 B1 | 5/2007 | Gai et al. | |
| 2003/0051043 A1 | 3/2003 | Wyschogrod et al. | |
| 2003/0177253 A1 * | 9/2003 | Schuehler et al. | 709/230 |
| 2005/0132107 A1 | 6/2005 | Cornet et al. | |
| 2005/0273450 A1 | 12/2005 | McMillen et al. | |
| 2007/0130140 A1 | 6/2007 | Cytron et al. | |
| 2008/0071783 A1 * | 3/2008 | Langmead et al. | 707/6 |
| 2008/0130649 A1 * | 6/2008 | Pullen | 370/394 |
| 2009/0276427 A1 * | 11/2009 | Duxbury | 707/6 |

OTHER PUBLICATIONS

Brodie, et al., "A Scalable Architecture for High-Throughput Regular-Expression Pattern Matching," Proceedings of the 33rd Annual International Symposium on Computer Architecture, Jun. 17-21, 2006, Boston, MA, USA, 12 pages.

* cited by examiner

*Primary Examiner* — Esther Benoit

(57) ABSTRACT

Examples of the present disclosure include methods, devices, and/or systems. An example method for performing data stream operations can include passing input data through a data stream splitter, dividing the input data into multiple lines of data upon recognizing a delimiter within the input data at the data stream splitter, splitting the multiple lines of data into multiple data streams at the data stream splitter, and performing data stream operations on each of the multiple data streams with a respective one of a plurality of finite state machines (FSMs).

14 Claims, 3 Drawing Sheets

DATA STREAM OPERATIONS

BACKGROUND

Data traffic from sensor, network, and/or storage subsystems can grow at a speed that can make it difficult to extract and/or analyze the data in a real-time manner. Regular expression pattern matching hardware, which can be a way for a user to express how a computer program should look for a specified pattern in data and then what the program is to do when each specified pattern match is found in the data, can be used to extract and/or analyze the data. For example, regular expression pattern matching hardware can be implemented in a finite state machine (FSM). Data can be fed into the FSM, where various operations can be performed on the data.

Some regular expression pattern matching hardware can perform data operations on one byte of data per cycle of the hardware. However, the speed of this approach is limited by a clock speed of a computer. Therefore, this approach cannot scale with a speed of incoming data traffic, which can transport multiple bytes per cycle. Other approaches have attempted to increase the amount of bytes that can processed by a single FSM. For example, multiple bytes can be input into the FSM at once. However, an improvement in performance resulting from multiple-byte processing can be outweighed by an increase in hardware costs and complexity, which can be associated with multiple-byte processing.

DETAILED DESCRIPTION

Figure 1:
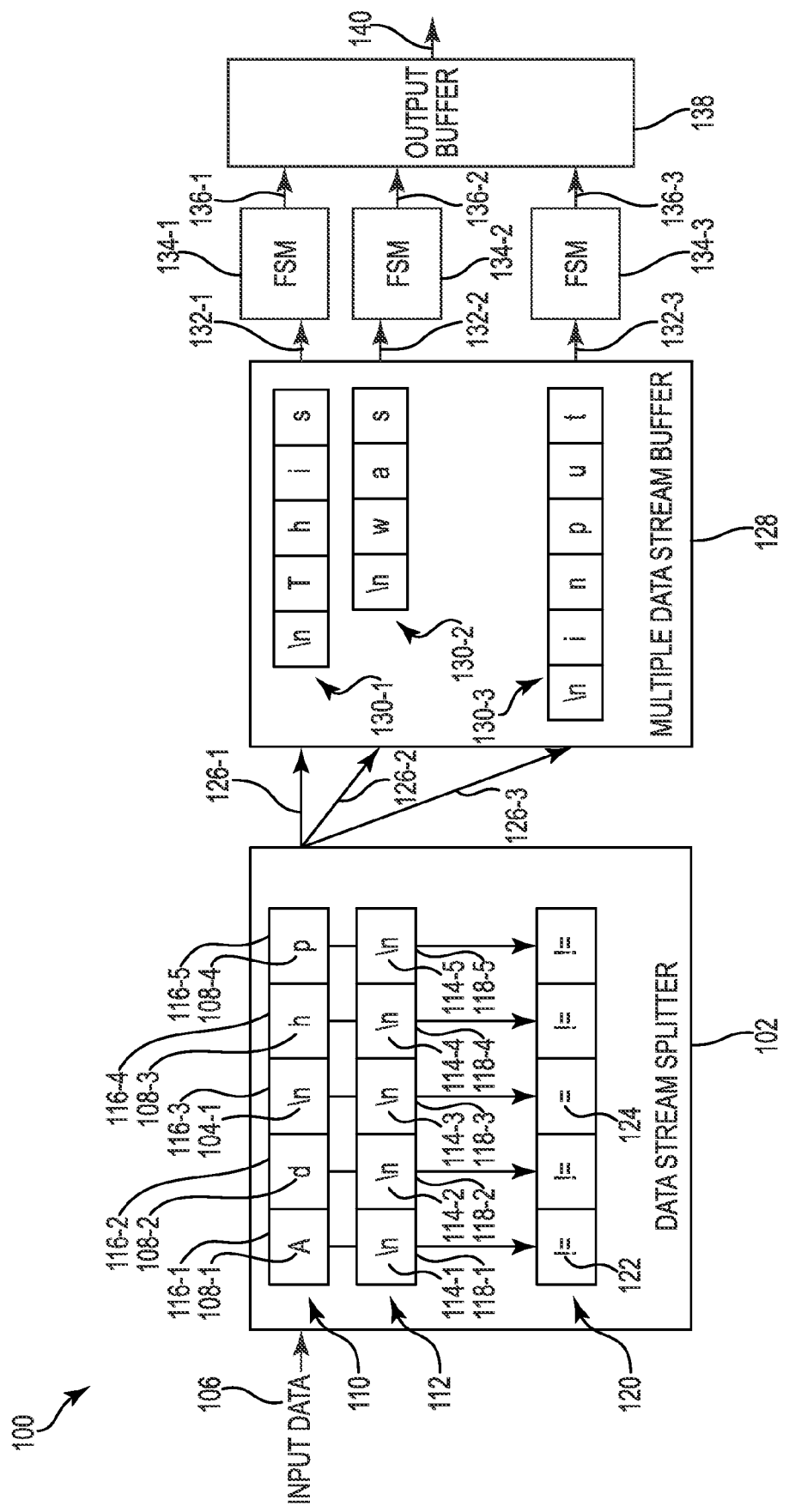
FIG. 1 illustrates an example of a system for performing data stream operations in accordance with one or more examples of the present disclosure.

Examples of the present disclosure include methods, devices, and/or systems. An example method for performing data stream operations can include passing input data through a data stream splitter, dividing the input data into multiple lines of data upon recognizing a delimiter within the input data at the data stream splitter, splitting the multiple lines of data into multiple data streams at the data stream splitter, and performing data stream operations on each of the multiple data streams with a respective one of a plurality of finite state machines (FSMs).

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit or digits correspond to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Some approaches have performed data operations on data by implementing an FSM that can operate on multiple bytes of data at once. Such approaches, however, can be plagued due to an increase in hardware costs and an increased complexity as a result of performing data operations on multiple bytes of data at once. According to some examples of the present disclosure, data stream operations can be performed with reduced cost and complexity in comparison to other approaches. Further, some examples of the present disclosure can increase a speed at which data stream operations can be performed.

FIG. 1 illustrates an example of a system for performing data stream operations in accordance with one or more examples of the present disclosure. The system 100 can include a data stream splitter 102. Data stream splitter 102 can recognize a delimiter 104-1 within input data 106. Input data 106 can include data characters 108-1, 108-2, 108-3, 108-4, referred to generally herein as data characters 108. Input data can include text (e.g., A, d, as shown in FIG. 1), numbers, and/or other symbols, although examples are not so limited. Input data 106 can also include the delimiter 104-1. The delimiter 104-1 can be a delimiter character and/or a plurality of delimiter characters that identify a beginning and/or end of a line data characters. Examples of a delimiter 104-1 can be a delimiter character such as "/n", $, #, a backslash, a forward slash, a space, a period, comma, although examples are not so limited.

The data stream splitter 102 can include an input register 110 that has a number of input registries 116-1, 116-2, 116-3, 116-4, 116-5, generally referred to herein as input registries 116. In an example, input registries 116 can be individual units of the input register 110. Each of the number of data characters 108 and the delimiter 104-1 included in the input data 106 can pass through a respective one of the number of input registries 116.

The data stream splitter 102 can include a delimiter register 112 that has a number of delimiter registries 118-1, 118-2, 118-3, 118-4, 118-5, generally referred to herein as delimiter registries 118. Each of the number of delimiter registries 118 can include programmed delimiters, 114-1, 114-2, 114-3, 114-4, 114-5, generally referred to herein as programmed delimiters 114. In an example, each of the number of input registries 116 can have a corresponding delimiter registry 118. For example, input registry 116-1 can correspond to delimiter registry 118-1.

In some embodiments, the delimiter register 112 can be programmed with programmed delimiters 114. For example, the delimiter register 112 can be programmed with programmed delimiters 114 such that delimiter 104-1 can be recognized by comparator logic 120, which can be included in the data stream splitter 102. For instance, in order to recognize a specific delimiter 104-1, such as "\n", each delimiter registry 118 can be programmed with "\n" as the programmed delimiters 114.

The input data 106 that passes through the input register 110 can be compared with the programmed delimiters 114 included in the delimiter register 112 by conducting a match operation to determine whether a match exists between the delimiter 104 and the programmed delimiters 114. The match operation can be performed by comparator logic 120 included in the data stream splitter 102. In an example, comparator logic 120 can compare data character 108-1 with programmed delimiter 114-1 by performing the match operation. For instance, comparator logic 120 can determine that no match exists between data character 108-1 (e.g., A) and the programmed delimiter 114-1 (e.g., \n) because the requisite delimiter (e.g., 104-1) is not present in the input registry 116-1 at the time of comparison between the data character 108-1 and the programmed delimiter 114-1 in order for a match to exist. The result of the match not being made can be represented, for example, by match fail indicator 122 (e.g., "!=").

Comparator logic 120 can compare delimiter 104-1 (e.g., as part of the input data 106) with programmed delimiter 114-3. For instance, comparator logic 120 can determine that a match exists between delimiter 104-1 (e.g., "\n") and the programmed delimiter 114-3 because the requisite delimiter (e.g., 104-1) is present in the input registry 116-3 at the time of comparison between the delimiter 104-1 and the programmed delimiter 114-3 in order for a match to exist. The result of the match being made can be represented, for example, by match success indicator 124 (e.g., "=").

The data stream splitter 102 can divide the input data 106 into multiple lines of data upon the recognition of the delimiter 104-1 at the data stream splitter 102. In an example, the data stream splitter 102 can divide the input data 106 into multiple lines of data upon comparator logic 120 determining that a match exists between the delimiter 104-1 and the programmed delimiter 114-3. For instance, data character 108-3 and data character 108-4 can be a line of data (e.g., "hp"), where the delimiter 104-1 marks an end of the line of data. Alternatively, and/or in addition, the delimiter 104-1 can mark a beginning of a line of data.

In various examples, a sequence indicator can be assigned to each of the multiple lines of data for reasons discussed herein. For example, a sequence indicator can be a sequence number that can be assigned to the line of data consisting of data character 108-3 and data character 108-4. For instance, a sequence number of "3" can be assigned to the line of data consisting of data character 108-3 and data character 108-4. The sequence indicator can be a monotonically increasing number. For example, a line of data passing through the input register 110 subsequent to the line of data consisting of data character 108-3 and data character 108-4 can be assigned a monotonically increasing sequence number of "4," although examples are not so limited. As another example, the sequence indicator can be a monotonically decreasing number. In some examples, the sequence indicator can be a letter and/or combination of symbols that identifies a position of a line of data in the input stream 106.

In some examples, the sequence number can be included within a line of data characters. For example, the sequence number can be included before and/or after the delimiter 104-1. The sequence number can be included at a beginning, end, and/or at a location between the beginning and end of a line of data characters.

The data stream splitter 102 can split the multiple lines of data into multiple data streams, 126-1, 126-2, 126-3, generally referred to herein as multiple data streams 126. Although 3 data streams 126 are illustrated in FIG. 1, any number of data streams can be included in the system 100. In an example, the data stream splitter can split a line of data into one of the multiple data streams 126. For instance, the data stream splitter 102 can split the line of data consisting of data character 108-3 and data character 108-4 into data stream 126-1 and can split a second line of data into data stream 126-3, etc.

In some examples, the data stream splitter 102 can alternate splitting lines of data between one of the multiple data streams 126. For example, the data splitter 102 can split a first line of data into stream 126-1, a second line of data into data stream 126-2 and a third line of data into data stream 126-3. The data stream splitter 102 can then repeat the pattern of splitting lines of data into the data stream 126-1, 126-2, and 126-3. Alternatively, and/or addition, the data stream splitter 102 can split lines of data into the multiple data streams 126 randomly or according to other policies such as a policy based on an availability of multiple data stream buffer 128.

In some examples, data stream splitter 102 can split lines of data into one of the multiple data streams 126 based on a size and/or complexity of the lines of data. For example, if data stream splitter 102 splits a line of data that is large and/or complex into one of the multiple data streams 126, the data stream splitter can split subsequent lines of data into the alternate multiple data streams 126 to balance data traffic between the multiple data streams 126. In such an example, the data stream splitter can be configured to determine a size and/or complexity of the line of data.

The system 100 can include a multiple data stream buffer 128. The multiple data stream buffer 128 can be defined as a holding place for the multiple data streams 126. Generally, buffers can support the coordination of separate activities that can operate at different speeds. The multiple data stream buffer 128 can buffer (e.g., hold) lines of data 130-1, 130-2, 130-3 that are included in the multiple data streams 126 and output multiple buffered data streams 132-1, 132-2, 132-3, generally referred to herein as multiple buffered data streams 132. In an example, the multiple data stream buffer 128 can buffer each of the multiple data streams 126 individually. For example, the multiple data stream buffer 128 can hold a data stream that includes a line and/or lines of data that are of a large size and/or complex, while allowing alternate data streams to pass through the multiple data stream buffer 128.

For instance, line of data 130-3 can be larger than line of data 130-2 because line of data 130-3 includes more characters than line of data 130-2. As a result, the multiple data stream buffer 128 can hold line of data 130-3 while allowing line of data 130-2 to pass through the multiple data stream buffer 128.

The system 100 can include a plurality of finite state machines (FSMs) 134-1, 134-2, 134-3, generally referred to herein as plurality of FSMs 134. Although three FSMs are shown, any number of FSMs can be used. The plurality of FSMs 134 can be machines, where each machine has a number of possible states. A state can be in response to an input provided to the plurality of machines (e.g., FSMs 134). For example, data stream operations can be performed on each of the multiple data streams 126 with a respective one of the plurality of FSMs 134 upon buffering of the multiple data streams 126 at the multiple data stream buffer 128. In an example, data stream operations can be performed in response to a pattern existing in data that is input to the plurality of FSMs 134. For instance, the plurality of FSMs 134 can perform pattern matching on incoming data, which can involve searching for patterns in data and determining whether a match exists between a pattern stored in the state and a pattern in the data.

Recognition of a pattern in the data can serve as a trigger for execution of the state, for example, performing data stream operations. Performing data stream operations can include searching for text lines that contain a term (e.g., "HP DeskJet") and then printing out each line in which a match for the term is found and/or substitute another text sequence (e.g., "DeskJet") where a match occurs, for example. In some examples, data stream operations can include text mining, ad-hoc queries on unstructured data, network packet filtering, intrusion detection, and/or security analytics, although examples are not so limited. Each of the data stream operations discussed herein can involve pattern matching.

In various examples, splitting input data 106 into multiple data streams 126 allows for the plurality of FSMs 134 to perform data stream operations on each one of the respective multiple data streams 126. This can allow for increased speed when performing data stream operations as opposed to previous approaches for performing data stream operations that have used a single FSM to process data from a single stream. For example, each one of the plurality of FSMs 134 can perform data stream operations on 1 byte per cycle of each one of the plurality of FSMs 134.

Because input data 106 can be split into any number of data streams (e.g., N number of data streams), and each data stream can be processed by a respective one of the plurality of FSMs (e.g., N number of FSMs) performing data stream operations at a particular rate (e.g., M bytes per cycle), this can allow for data stream operations to be performed at a collective rate (e.g., M*N bytes per cycle). As such, examples of the present disclosure can perform data stream operations at a rate that is greater than that provided by the previous approaches. Because each of the plurality of FSMs operates at a particular rate, examples of the present disclosure can provide for reduced hardware costs and complexity in contrast to the increased hardware costs and complexity associated with previous approaches. Furthermore, examples of the present disclosure can perform data stream operations at rates greater than that of a single FSM.

In some examples, data stream operations performed by the plurality of FSMs 134 can be order dependent. Order dependent data stream operations can be defined as data stream operations where an order of operated on data output by the plurality of FSMs 134 must match a predefined order (e.g., to satisfy a constraint on the order of data imposed downstream of the FSMs 134). For example, where data stream operations involve detecting a sequence of events that constitute a security threat to an operating system of a computing device, the order of the operated on data output by the plurality of FSMs may have to match a predefined order. In such a case, operated on data streams 136-1, 136-2, 136-3, generally referred to herein as operated on data streams 136 can be output to an output buffer 138. The output buffer 138 can be provided to merge multiple lines of operated on data included in operated on data streams 136. In an example, the multiple lines of operated on data can be ordered based on the sequence indicator assigned to each of the multiple lines of data.

As discussed herein, data stream operations can be performed on each one of the multiple data streams 126 by a respective one of the plurality of FSMs 134. As such, because the lines of data may be of varying size and/or complexity, it may take longer to perform data stream operations on a first line of data that is of a larger size and/or of a greater complexity than a second line of data. In an example, a third line of data with a size and/or complexity that is at a level between the first line of data and the second line of data can be output from one of the plurality of FSMs 134 between the first line of operated on data and the second line of operated on data. Examples of the present disclosure can order the multiple lines of operated on data at the output buffer based on the sequence indicator assigned to each of the multiple lines of data and thus output an ordered operated on data stream 140 from the output buffer 138.

In some embodiments, data stream operations performed by the plurality of FSMs 134 can be order oblivious. Order oblivious data stream operations can be defined as data stream operations that do not require an ordering of data output from the plurality of FSMs 134. For example, in a data stream operation that involves counting a number of occurrences of a certain key word, the order of the operated on data output by the plurality of FSMs 134 may not be important. In such a case, the output buffer 138 may not be included in the system 100.

Figure 2:
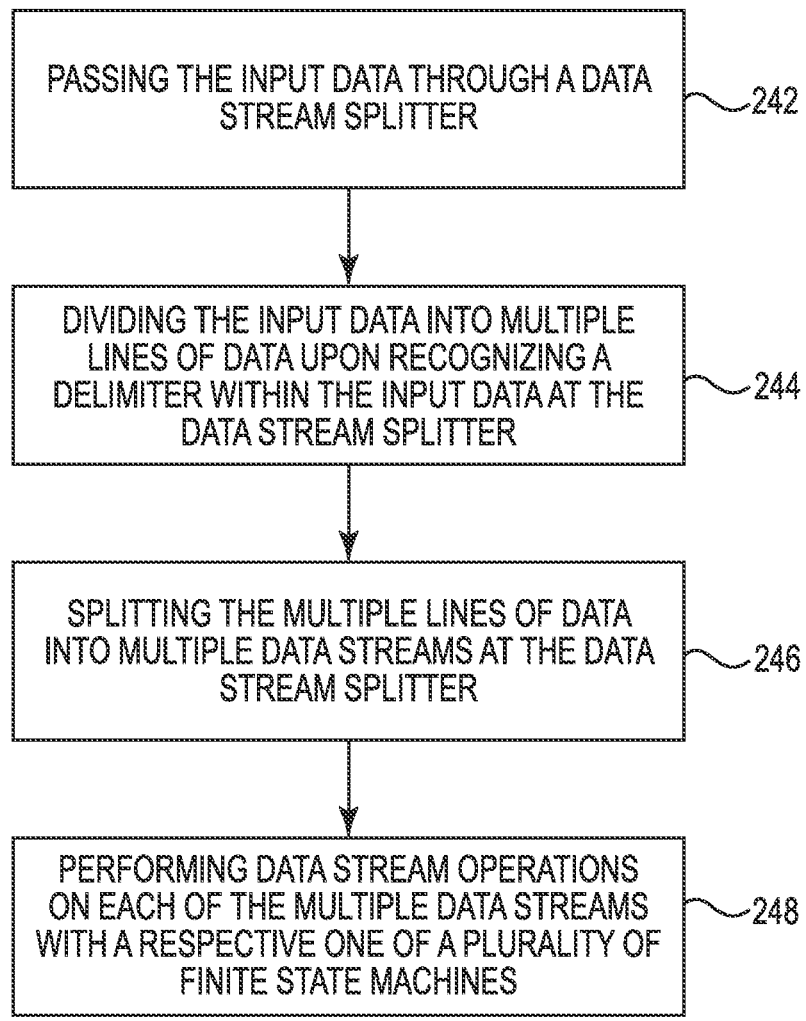
FIG. 2 illustrates an example of a method for performing data stream operations in accordance with one or more examples of the present disclosure.

FIG. 2 illustrates an example of a method for performing data stream operations in accordance with one or more examples of the present disclosure. At block 242 the method includes passing the input data through a data stream splitter. Passing input data through the data stream splitter can include passing the input data through an input register in the data stream splitter. In an example, passing the input data through the data stream splitter can include passing a number of data characters included in the input data through the input register. The input register can include a number of input registries. In some examples, passing the number of data characters included in the input data through the input register can include passing each of the number of data characters through a respective one of the number of input registries.

The method includes dividing the input data into multiple lines of data upon recognizing a delimiter within the input data at the data stream splitter, at block 244. In an example, recognizing the delimiter within the input data can include comparing the input data passing through the input register with a number of programmed delimiters in a delimiter register. In some embodiments, comparing the input data passing through the input register with the number of programmed delimiters in the delimiter register can include determining whether the delimiter within the input data matches one of the number of programmed delimiters in the delimiter register.

The method includes, at block 246, splitting the multiple lines of data into multiple data streams at the data stream splitter. At block 248, the method includes performing data stream operations on each of the multiple data streams with a respective one of a plurality of finite state machines FSMs. Performing data stream operations on each of the multiple data streams can include performing data stream operations on one data character per cycle at each of the plurality of FSMs.

Some examples can include performing data stream operations that are order-oblivious. Some examples can include performing data stream operations that are order dependent. In an example, performing data stream operations that are order dependent can include assigning a sequence indicator to each of the multiple data streams at the data stream splitter. The sequence indicator can be a monotonically increasing sequence number. Upon performing the data stream operations at the plurality of FSMs, the method can include ordering the data at an output buffer based on the sequence indicator.

Figure 3:
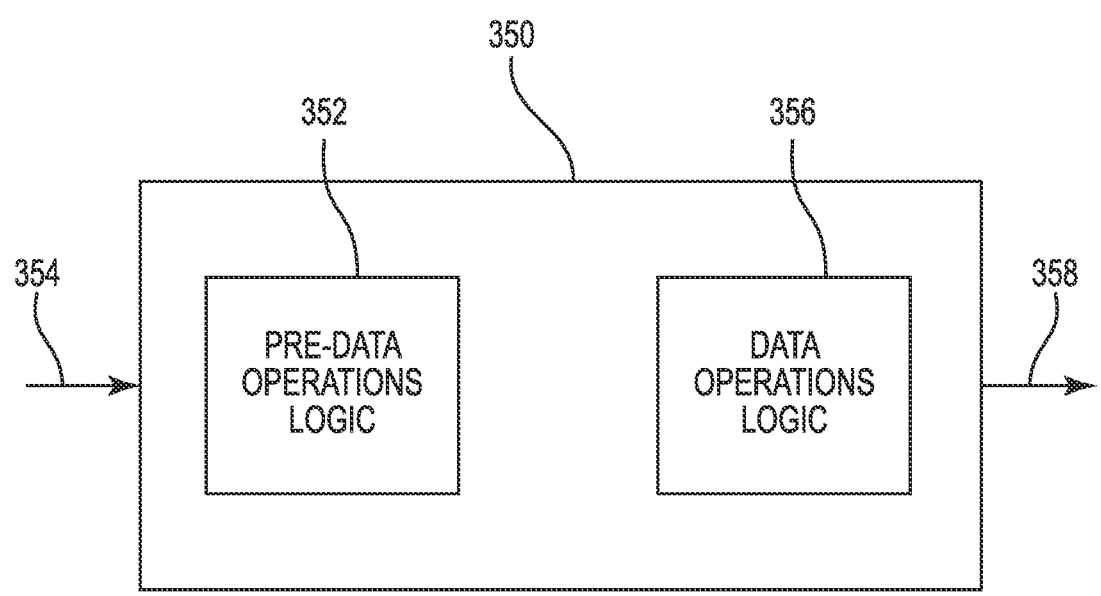
FIG. 3 illustrates an example of a device for performing data stream operations in accordance with one or more examples of the present disclosure.

FIG. 3 illustrates an example of a device for performing data stream operations in accordance with one or more examples of the present disclosure. The device can be a hardware device 350. Hardware device 350 can be, for example, hardware logic (e.g., in the form of application specific integrated circuits (ASICs) such as in a network chip on a network device such as a router or switch) among others, however, examples of the present disclosure are not limited to a particular implementation of the hardware device 350 unless otherwise indicated. As shown in FIG. 3, hardware device 350 includes input data path 354, pre-data stream operations logic 352, data stream operations logic 356, and output data path 358.

Pre-data stream operations logic 352 can be included in hardware device 350 to receive input data at an input register of a data stream splitter. In an example, input data can include a delimiter. Pre-data stream operations logic 352 can be included to conduct a match operation at the stream splitter to determine that a match exists between the delimiter included in the input data and a programmed delimiter in a delimiter register. Pre-data stream operations logic 352 can be included to divide the input data into multiple lines of data at the delimiter included in the input data. In an example, the delimiter can indicate a separation between the first line of data and the second line of data. Pre-data stream operations logic 352 can be included to split the multiple lines of data into multiple data streams at the data stream splitter.

Data stream operations logic 356 can be included to perform pattern matching on each of the multiple data streams with a respective one of a plurality of FSMs. In an example, data stream operations logic 356 can be included to perform pattern matching on each of the multiple data streams in parallel with the multiple FSMs. For instance, pattern matching can be performed on a first, second, and third data stream at each of the multiple FSMs at a same time.

Hardware device 350 can include post-data operations logic. Post-data operations logic can order data after performing data stream operations that are order dependent, as discussed herein. The post-data operations logic can be performed through hardware and/or computer-readable instructions (CRI) stored on a non-transitory computer-readable medium (CRM). The CRM can include volatile and/or non-volatile memory such as random access memory (RAM), magnetic memory such as a hard disk, floppy disk, and/or tape memory, a solid state drive (SSD), flash memory, phase change memory, etc.

The CRM can be in communication with processor resources via a communication path. The communication path can be local or remote to a computer associated with the processor resources. Examples of a local communication path can include an electronic bus internal to a computer where the CRM is one of a volatile, non-volatile, fixed, and/or removable storage medium in communication with the processor resources via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path can be such that the CRM is remote from the processor resources such as in the example of a network connection between the CRM and the processor resources (e.g., the communication path can be a network connection). Examples of such a network connection can include a local area network (LAN), a wide area network (WAN), a personal area network (PAN), the Internet, among other examples of networks. In such examples, the CRM may be associated with a first computer (e.g., a server) and the processor resources may be associated with a second computer (e.g., a computing device). The first and second computers can be in communication via a networked communication path.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

What is claimed:

1. A method for performing data stream operations, comprising:
   passing input data through a data stream splitter;
   dividing the input data into multiple lines of data upon recognizing a delimiter within the input data at the data stream splitter;
   splitting the multiple lines of data into multiple data streams at the data stream splitter;
   assigning a sequence indicator to each of the multiple data streams at the data stream splitter;
   buffering each of the multiple data streams individually at a multiple data stream buffer, wherein buffering includes holding complex lines of data associated with a first number of the multiple data streams while allowing a second number of the multiple data streams to pass through the multiple data stream buffer;
   performing order dependent data stream operations on each of the buffered multiple data streams with a respective one of a plurality of finite state machines (FSMs); and
   ordering the data, upon performing the order dependent data stream operations at the plurality of FSMs, at an output buffer based on the sequence indicator.

2. The method of claim 1, wherein:
   passing input data through the data stream splitter includes passing the input data through an input register in the data stream splitter; and
   recognizing the delimiter within the input data includes comparing the input data passing through the input register with a number of programmed delimiters in a delimiter register.

3. The method of claim 2, wherein comparing the input data passing through the input register with the number of programmed delimiters in the delimiter register includes determining whether the delimiter within the input data matches one of the number of programmed delimiters in the delimiter register.

4. The method of claim 2, wherein:
   passing the input data through the data stream splitter includes passing a number of data characters included in the input data through the input register, the input register including a number of input registries; and
   passing the number of data characters included in the input data through the input register includes passing each of the number of data characters through a respective one of the number of input registries.

5. The method of claim 1, wherein performing order dependent data stream operations on each of the multiple data streams includes performing data stream operations on one data character per cycle at each of the plurality of FSMs.

6. The method of claim 5, wherein performing order dependent data stream operations includes performing data stream operations that are order-oblivious.

7. A hardware device, comprising:
pre-data stream operations logic to:
receive input data at an input register of a data stream splitter, wherein the input data includes a delimiter,
conduct a match operation at the stream splitter to determine that a match exists between the delimiter included in the input data and a programmed delimiter in a delimiter register;
divide the input data into multiple lines of data at the delimiter included in the input data;
split the multiple lines of data into multiple data streams at the data stream splitter; and
assign a sequence indicator to each of the multiple data streams at the data stream splitter;
buffer each of the multiple data streams individually at a multiple data stream buffer, wherein buffering includes holding complex lines of data associated with a first number of the multiple data streams while allowing a second number of the multiple data streams to pass through the multiple data stream buffer; and
data stream operations logic to:
perform, with a computer, order dependent pattern matching on each of the buffered multiple data streams with a respective one of a plurality of finite state machine (FSMs); and
order the data, upon performing the order dependent data stream operations at the plurality of FSMs, at an output buffer based on the sequence indicator.

8. The hardware device of claim 7, further comprising pre-data stream operations logic to divide the input data into a first line of data and a second line of data, wherein the delimiter indicates a separation between the first line of data and the second line of data.

9. The hardware device of claim 7, further comprising data stream operations logic to perform pattern matching on each of the multiple data streams in parallel with the multiple FSMs.

10. A system for performing data stream operations, comprising:
a data stream splitter to:
recognize a delimiter within input data that is received at a data stream splitter;
divide the input data into multiple lines of data upon the recognition of the delimiter at the data stream splitter;
assign a sequence indicator to each of the multiple lines of data;
split the multiple lines of data into multiple data streams;
a plurality of finite state machines (FSMs) to:
perform, with a computer, data stream operations on each of the multiple data streams with a respective one of the plurality of FSMs upon buffering of the multiple data streams at a multiple data stream buffer, wherein buffering includes holding complex lines of data associated with a first number of the multiple data streams while allowing a second number of the multiple data streams to pass through the multiple data stream buffer; and
an output buffer to:
merge the multiple data streams based on the sequence indicator of the multiple lines of data.

11. The system of claim 10, wherein:
the data stream splitter includes an input register that has a number of input registries;
the input data includes a number of data characters, and
each of the number of data characters passes through a respective one of the number of input registries.

12. The system of claim 10, wherein each of the multiple data streams are buffered individually by the multiple data stream buffer.

13. The system of claim 10, wherein:
the data stream splitter includes a delimiter register that has a plurality of delimiter registries; and
each of the number of delimiter registries includes a programmed delimiter.

14. The system of claim 13, wherein each of the number of input registries has a corresponding delimiter registry of the plurality of delimiter registries.

* * * * *